United States Patent
Tokuchi (10) Patent No.: US 11,943,821 B2
(45) Date of Patent: Mar. 26, 2024

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 411 days.

(21) Appl. No.: 17/128,870

(22) Filed: Dec. 21, 2020

(65) Prior Publication Data

US 2021/0385882 A1 Dec. 9, 2021

(30) Foreign Application Priority Data

Jun. 8, 2020 (JP) .................................. 2020-099529

(51) Int. Cl.
| | | |
|---|---|---|
| *H04W 76/10* | (2018.01) | |
| *G06F 3/16* | (2006.01) | |
| *H04R 1/02* | (2006.01) | |
| *H04W 4/02* | (2018.01) | |
| *G06F 3/14* | (2006.01) | |

(52) U.S. Cl.
CPC ............ *H04W 76/10* (2018.02); *G06F 3/165* (2013.01); *H04R 1/028* (2013.01); *H04W 4/023* (2013.01); *G06F 3/14* (2013.01)

(58) Field of Classification Search
CPC ....... H04W 76/10; H04W 4/023; G06F 3/165; G06F 3/14; H04R 1/028; H04N 1/00891; H04B 1/385

See application file for complete search history.

(56) References Cited

U.S. PATENT DOCUMENTS

| | | | | |
|---|---|---|---|---|
| 2017/0280495 A1* | 9/2017 | Zhang | ................... | H04W 76/10 |
| 2021/0034306 A1* | 2/2021 | Takeuchi | ............... | H04W 48/16 |
| 2021/0099600 A1* | 4/2021 | Takarabe | ........... | H04N 1/00891 |

FOREIGN PATENT DOCUMENTS

| | | | | | |
|---|---|---|---|---|---|
| JP | 2001197195 A | * | 7/2001 | ............. | H04B 1/385 |
| JP | 2016-218632 A | | 12/2016 | | |
| JP | 2017134011 A | * | 8/2017 | ............. | G06F 1/163 |
| JP | 6463545 B1 | * | 2/2019 | | |
| JP | 2019-186840 A | | 10/2019 | | |
| JP | 7140538 B2 | * | 9/2022 | | |
| JP | 7197123 B2 | * | 12/2022 | | |
| KR | 20210110395 A | * | 2/2018 | | |
| KR | 20210110395 A | * | 2/2019 | | |

* cited by examiner

*Primary Examiner* — Ayaz R Sheikh
*Assistant Examiner* — Louis Samara
(74) *Attorney, Agent, or Firm* — Oliff PLC (57) ABSTRACT

An information processing apparatus includes a processor configured to cancel establishment of communication between an external device and the information processing apparatus in accordance with an instruction to cancel the establishment of the communication. The instruction is sent to the information processing apparatus from another device that is different from the external device and the information processing apparatus.

18 Claims, 2 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-099529 filed Jun. 8, 2020.

BACKGROUND

(i) Technical Field

The present disclosure relates to an information processing apparatus and a non-transitory computer readable medium.

(ii) Related Art

Japanese Unexamined Patent Application Publication No. 2016-218632 describes an alarm system in which alarm units are paired with each other by operating inspection operation units of the alarm units for a predetermined time.

Japanese Unexamined Patent Application Publication No. 2019-186840 describes a wireless communication system in which a plurality of master-slave pairs each composed of one slave unit and one master unit are provided, the state of communication of all the master-slave pairs is monitored, and the slave units are controlled so as to change combinations of the slave units and the master units in the case where it is determined that there is a fault in the state of communication of all the master-slave pairs.

SUMMARY

It is conceivable that techniques for communication between a plurality of devices are used for fraudulent activities etc.

Aspects of non-limiting embodiments of the present disclosure relate to canceling communication established between a plurality of devices in accordance with an instruction from a device that does not rely on an instruction from a device included in the plurality of devices.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to cancel establishment of communication between an external device and the information processing apparatus in accordance with an instruction to cancel the establishment of the communication, the instruction being sent to the information processing apparatus from another device that is different from the external device and the information processing apparatus.

BRIEF DESCRIPTION OF THE DRAWINGS

An exemplary embodiment of the present disclosure will be described in detail based on the following figures, wherein.

DETAILED DESCRIPTION

Figure 1:
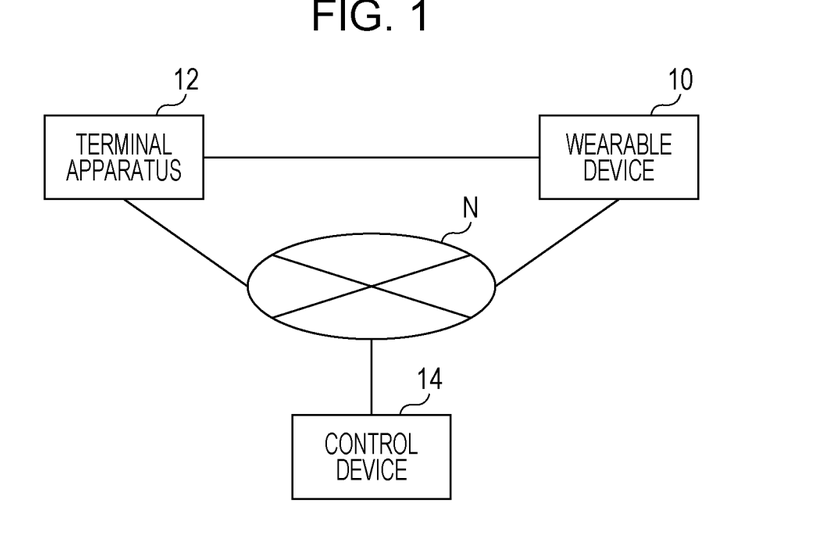
FIG. 1 is a block diagram illustrating the configuration of an information processing system according to the present exemplary embodiment.

An information processing system according to the present exemplary embodiment will be described with reference to FIG. 1. FIG. 1 illustrates an example of the configuration of the information processing system according to the present exemplary embodiment.

The information processing system according to the present exemplary embodiment includes at least one wearable device 10, at least one terminal apparatus 12, and a control device 14 by way of example. The information processing system may also include other devices (e.g. a server etc.).

The wearable device 10, the terminal apparatus 12, and the control device 14 have a function to communicate with a different device. The communication may be made through wired communication in which a cable is used, or may be made through wireless communication. That is, the devices may be physically connected to a different device etc. through a cable to transmit and receive information to and from each other, or may transmit and receive information to and from each other through wireless communication. Examples of the wireless communication include near-field wireless communication and Wi-Fi (registered trademark). Wireless communication of a different standard may also be used. Examples of the near-field wireless communication include Bluetooth (registered trademark), Radio Frequency Identifier (RFID), and Near Field Communication (NFC). The devices may also communicate with a different device via a communication path such as a Local Area Network (LAN) and the Internet. The devices may also communicate with a different device via a communication path N such as the Internet, for example.

The wearable device 10 is a device to be worn by a user to be used, and includes at least one of a speaker and a display device. The wearable device 10 may be an ear-wearable device (e.g. an earphone, a headphone, a hearing aid, etc.) to be worn on an ear of the user, may be a glass-type device, may be a contact lens-type device to be worn on an eye (e.g. an eyeball) of the user, may be a device (e.g. a wristwatch-type device such as a smartwatch etc.) to be worn on a hand, a wrist, a finger, etc. of the user, may be a device to be worn on the neck of the user, may be a device to be worn on the body (e.g. abdomen, chest, etc.) of the user, and may be a device to be embedded in the skin of the user, for example. The wearable device 10 may be worn at a plurality of locations of the user. The glass-type device has a function to display an image using a technique such as augmented reality (AR), mixed reality (MR), and virtual reality (VR), for example. The glass-type device may be AR glasses, VR glasses, MR glasses, etc., for example. A head mounted display (HMD) may also be used as the wearable device 10.

Examples of the terminal apparatus 12 include a personal computer (hereinafter referred to as a "PC"), a tablet PC, a smartphone, a smart speaker, a cellular phone, etc. The terminal apparatus 12 may be a device to be worn, held, or carried by the user to be used, or may be a device to be installed to be used, rather than being worn, held, or carried by the user.

In the present exemplary embodiment, communication is established between the wearable device 10 and the terminal apparatus 12 so that information is transmitted and received between the wearable device 10 and the terminal apparatus 12. Examples of the communication include wireless communication. A specific example of the communication is near-field wireless communication such as Bluetooth.

For example, in the case where the wearable device 10 is an ear-wearable device that includes an earphone or a headphone, sound data such as music data or voice data are transmitted from the terminal apparatus 12 to the wearable device 10 so that a sound based on the sound data is generated from the earphone or the headphone of the wearable device 10.

In the case where the wearable device 10 is a device that includes a display device such as AR glasses, VR glasses, or MR glasses, image data (e.g. still image data or moving image data) are transmitted from the terminal apparatus 12 to the wearable device 10 so that an image based on the image data is displayed on the display device of the wearable device 10.

The wearable device 10 may be a device that includes an earphone or a headphone and a display device such as AR glasses, VR glasses, or MR glasses.

The concept of establishment of communication include: a state in which information is transmitted and received with the wearable device 10 and the terminal apparatus 12 connected to each other through near-field wireless communication; a state in which information may be transmitted and received with the wearable device 10 and the terminal apparatus 12 connected to each other through near-field wireless communication; a state in which pairing (i.e. synchronization) between the wearable device 10 and the terminal apparatus 12 is completed; etc. Pairing is a process of allowing mutual authentication, that is, allowing the wearable device 10 and the terminal apparatus 12 to authenticate each other and permit the wearable device 10 and the terminal apparatus 12 to communication with each other. Pairing is occasionally referred to as "mutual registration". The state in which pairing is completed is a state in which mutual authentication is completed to enable the wearable device 10 and the terminal apparatus 12 to communicate with each other. For example, when pairing is completed between the wearable device 10 and the terminal apparatus 12, the wearable device 10 and the terminal apparatus 12 are able to transmit and receive information therebetween using Bluetooth.

Alternatively, communication may be established between one or more wearable devices 10 and one or more terminal apparatuses 12 so that information is transmitted and received therebetween. For example, communication may be established between one wearable device 10 and a plurality of terminal apparatuses 12, and communication may be established between a plurality of wearable devices 10 and one terminal apparatus 12. For example, information may be transmitted from one terminal apparatus 12 to a plurality of wearable devices 10 using a technique such as a multi-stream function (e.g. "multi-stream audio" achieved by Bluetooth) to transmit information to a plurality of devices and a function (e.g. "broadcast audio" achieved by Bluetooth) to enable broadcast of information to surrounding devices. For example, "LE Audio" achieved by Bluetooth etc. may be used.

One of the wearable device 10 and the terminal apparatus 12 is an example of an information processing apparatus, and the other device is an example of an external device. For example, the wearable device 10 may be an example of the information processing apparatus, and the terminal apparatus 10 may be an example of the external device. On the contrary, the terminal apparatus 12 may be an example of the information processing apparatus, and the wearable device 10 may be an example of the external device.

The control device 14 is configured to control establishment of communication established between the wearable device 10 and the terminal apparatus 12. The control device 14 is a device, a server, etc. that is used by a manager, for example, and corresponds to an example of a different device.

For example, the control device 14 transmits cancellation information, which indicates an instruction to cancel establishment of communication established between the wearable device 10 and the terminal apparatus 12, to at least one of the wearable device 10 and the terminal apparatus 12. The cancellation information is information for forcibly canceling establishment of such communication.

In another example, in the case where the wearable device 10 includes a speaker (e.g. in the case where the wearable device 10 is an ear-wearable device that includes an earphone or a headphone), the control device 14 may transmit volume control information, which indicates an instruction to cause the speaker to generate a specific sound with a volume that is equal to or more than a volume determined in advance, to at least one of the wearable device 10 and the terminal apparatus 12. The volume control information is information for forcibly causing the speaker to generate the specific sound. The specific sound may be a sound determined in advance (e.g. noise, masking sound, etc.), or may be changed in random, for example. The specific sound may be an emergency alert sound etc. for informing the user of occurrence of a natural disaster such as an earthquake, an incident, etc. The volume control information may be information that instructs muting, or may be information that instructs a volume reduction.

In still another example, in the case where the wearable device 10 includes a display device (e.g. in the case where the wearable device 10 is a device that includes a display device such as AR glasses, VR glasses, or MR glasses), the control device 14 may transmit image control information, which indicates an instruction to cause the display device to display a specific image determined in advance, to at least one of the wearable device 10 and the terminal apparatus 12. The image control information is information for forcibly causing the display device to display the specific image. The specific image may be an image determined in advance, or may be changed in random, for example. Examples of the specific image include an image that may obstruct the viewing field of the user. For example, the specific image may be an image that represents a specific color such as white, black, and other colors, an image that represents a specific pattern, etc.

The control device 14 may cause the speaker to generate the specific sound described above, or cause the display device to display the specific image described above, in the case where establishment of communication between the wearable device 10 and the terminal apparatus 12 may not be canceled.

The control device 14 may transmit the cancellation information, the volume control information, and the image control information to the wearable device 10 and the terminal apparatus 12 via the communication path N, or may transmit the cancellation information, the volume control information, and the image control information to the wearable device 10 and the terminal apparatus 12 using near-field wireless communication such as Bluetooth.

The control device 14 stores information (e.g. address information such as an Internet Protocol (IP) address) for communicating with each of the wearable device 10 and the terminal apparatus 12, other information (e.g. information such as an identification (ID) for identifying each of the wearable device 10 and the terminal apparatus 12) related to each of the wearable device 10 and the terminal apparatus 12, etc. Such information may be stored in advance in the control device 14, may be stored in the control device 14 in the case where at least one of the wearable device 10 and the terminal apparatus 12 is used at a specific location, or may be stored in the control device 14 in the case where at least one of the wearable device 10 and the terminal apparatus 12 is used at a specific time.

Figure 2:
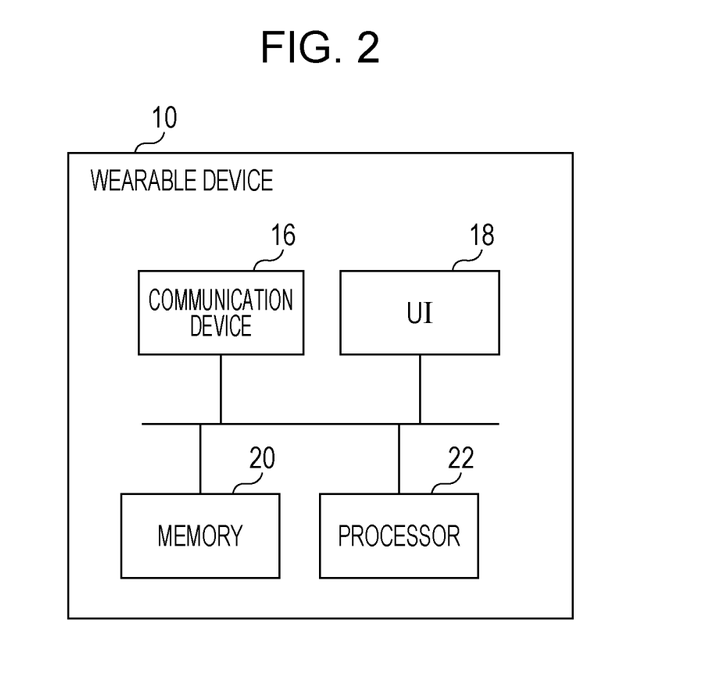
FIG. 2 is a block diagram illustrating the configuration of a wearable device.

The hardware configuration of the wearable device 10 will be described below with reference to FIG. 2. FIG. 2 illustrates an example of the hardware configuration of the wearable device 10.

The wearable device 10 includes a communication device 16, a user interface (UI) 18, a memory 20, and a processor 22, for example.

The communication device 16 is a communication interface that includes a communication chip, a communication circuit, etc., and has a function of transmitting information to a different device and a function of receiving information transmitted from a different device. The communication device 16 may have a wireless communication function, or may have a wired communication function. The communication device 16 may communicate with a different device by using near-field wireless communication, or may communicate with a different device via a communication path such as a LAN or the Internet, for example. In the present exemplary embodiment, the communication device 16 communicates with one or more terminal apparatuses 12 using near-field wireless communication such as Bluetooth. The communication device 16 may also communicate with the control device 14 using near-field wireless communication, a LAN, the Internet, etc.

The UI 18 is a user interface, and includes at least one of a display device such as a liquid crystal display and an electro-luminescence (EL) display and a device (e.g. a speaker) that generates a sound.

In the case where the wearable device 10 is an ear-wearable device to be worn on an ear of the user to be used, the UI 18 includes an earphone or a headphone. In this case, the entire wearable device 10 may be an earphone or a headphone. For example, a wireless earphone or a wireless headphone is an example of the wearable device 10 as an ear-wearable device.

In the case where the wearable device 10 is a glass-type wearable device (e.g. AR glasses, VR glasses, MR glasses, etc.) to be worn by the user to be used or a wearable device (e.g. a contact lens-type wearable device that contacts the cornea of an eye of the user to be used) to be worn on an eye of the user to be used, the UI 18 includes a display device. In the glass-type wearable device, in addition, the display device may be constituted of a touch screen.

The wearable device 10 may be a device that includes the wireless earphone or the wireless headphone discussed above and the glass-type or contact lens-type wearable device. The UI 18 may include a sound pick-up device such as a microphone.

The memory 20 is a device that constitutes one or more storage areas that store various kinds of information. Examples of the memory 20 include a hard disk drive, various types of memories (e.g. a random access memory (RAM), a dynamic random access memory (DRAM), a read only memory (ROM), etc.), other storage devices (e.g. an optical disk etc.), and a combination thereof. One or more memories 20 are included in the wearable device 10.

The memory 20 stores information for identifying the wearable device 10, address information for communication (e.g. address information on the wearable device 10, address information on the terminal apparatus 12, and address information on the control device 14), etc. For example, an IP address, a media control access (MAC) address, and other addresses (e.g. an electronic mail address etc.) may be stored as the address information.

The processor 22 is configured to control operation of various portions of the wearable device 10. The processor 22 may include a memory.

For example, the processor 22 communicates with the various devices using the communication device 16. Specifically, the processor 22 establishes near-field wireless communication such as Bluetooth with the terminal apparatus 12, and transmits and receives information to and from the terminal apparatus 12 through the near-field wireless communication. The processor 22 also transmits and receives information to and from the control device 14 using near-field wireless communication or other communication.

In the case where the wearable device 10 includes an earphone or a headphone, the processor 22 may cause the earphone or the headphone to generate a sound on the basis of voice data, music data, or other sound data. In the case where the wearable device 10 includes a display device, the processor 22 may cause the display device to display image data (e.g. still image data or moving image data). The voice data, the image data, etc. may be stored in the memory 20, or may be transmitted from the terminal apparatus 12 or the control device 14 to the wearable device 10.

Besides, the processor 22 may receive information input via the UI 18.

Figure 3:
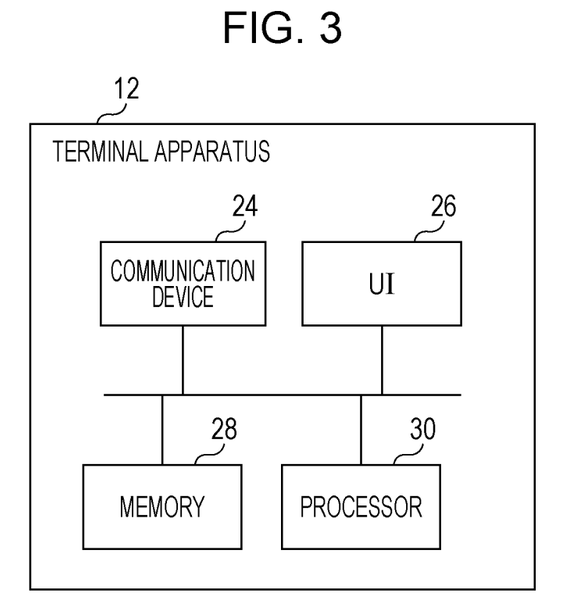
FIG. 3 is a block diagram illustrating the configuration of a terminal apparatus.

The hardware configuration of the terminal apparatus 12 will be described below with reference to FIG. 3. FIG. 3 illustrates an example of the hardware configuration of the terminal apparatus 12.

The terminal apparatus 12 includes a communication device 24, a UI 26, a memory 28, and a processor 30, for example.

The communication device 24 is a communication interface that includes a communication chip, a communication circuit, etc., and has a function of transmitting information to a different device and a function of receiving information transmitted from a different device. The communication device 24 may have a wireless communication function, or may have a wired communication function. The communication device 24 may communicate with a different device by using near-field wireless communication, or may communicate with a different device via a communication path such as a LAN or the Internet, for example. In the present exemplary embodiment, the communication device 24 communicates with one or more wearable devices 10 using near-field wireless communication such as Bluetooth. The communication device 24 may also communicate with the control device 14 using near-field wireless communication, a LAN, the Internet, etc.

The UI 26 is a user interface, and includes a display device and an operation device. The display device may be a liquid crystal display, an EL display, etc. The operation device may be a keyboard, an input key, an operation panel, etc. The UI 26 may be a UI that serves as both the display device and the operation device such as a touch screen. In addition, the UI 26 may include a microphone, or the UI 26 may include a speaker that generates a sound.

The memory 28 is a device that constitutes one or more storage areas that store various kinds of information. Examples of the memory 28 include a hard disk drive, various types of memories (e.g. a RAM, a DRAM, a ROM, etc.), other storage devices (e.g. an optical disk etc.), and a combination thereof. One or more memories 28 are included in the terminal apparatus 12.

The memory 28 stores information for identifying the terminal apparatus 12, address information for communication (e.g. address information on the wearable device 10, address information on the terminal apparatus 12, and address information on the control device 14), etc. For example, an IP address, a MAC address, and other addresses (e.g. an electronic mail address etc.) may be stored as the address information.

The processor 30 is configured to control operation of various portions of the terminal apparatus 12. The processor 30 may include a memory.

For example, the processor 30 communicates with the various devices using the communication device 24. Specifically, the processor 30 establishes near-field wireless communication such as Bluetooth with the wearable device 10, and transmits and receives information to and from the wearable device 10 through the near-field wireless communication. The processor 30 also transmits and receives information to and from the control device 14 using near-field wireless communication or other communication.

In the case where the wearable device 10 includes an earphone or a headphone, the processor 30 may cause the earphone or the headphone to generate a sound on the basis of voice data, music data, or other sound data. In the case where the wearable device 10 includes a display device, the processor 30 may cause the display device to display image data (e.g. still image data or moving image data). The voice data, the image data, etc. may be stored in the memory 20 of the wearable device 10, or may be transmitted from the terminal apparatus 12 or the control device 14 to the wearable device 10. That is, generation of a sound from the earphone or the headphone and display of an image may be performed by the processor 22 of the wearable device 10, or may be performed by the processor 30 of the terminal apparatus 12.

Figure 4:
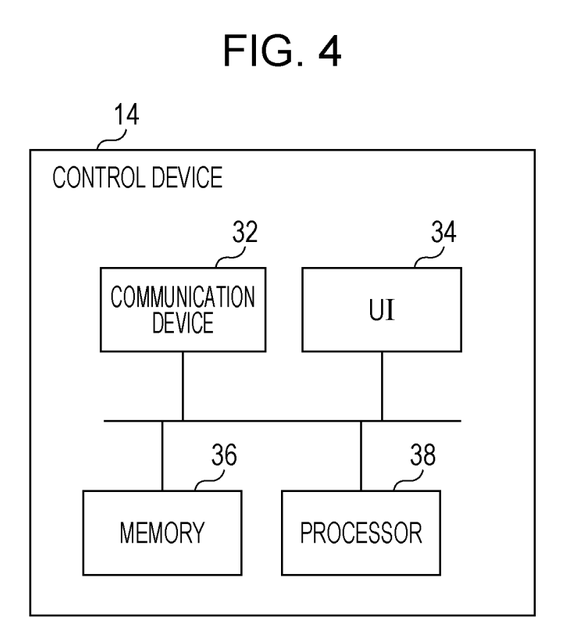
FIG. 4 is a block diagram illustrating the configuration of a management device.

The hardware configuration of the control device 14 will be described below with reference to FIG. 4. FIG. 4 illustrates an example of the hardware configuration of the control device 14.

The control device 14 includes a communication device 32, a UI 34, a memory 36, and a processor 38, for example.

The communication device 32 is a communication interface that includes a communication chip, a communication circuit, etc., and has a function of transmitting information to a different device and a function of receiving information transmitted from a different device. The communication device 32 may have a wireless communication function, or may have a wired communication function. The communication device 32 may communicate with a different device by using near-field wireless communication, or may communicate with a different device via a communication path such as a LAN or the Internet, for example. In the present exemplary embodiment, the communication device 32 communicates with the wearable device 10 and the terminal apparatus 12 using near-field wireless communication, a LAN, the Internet, etc.

The UI 34 is a user interface, and includes a display device and an operation device. The display device may be a liquid crystal display, an EL display, etc. The operation device may be a keyboard, an input key, an operation panel, etc. The UI 34 may be a UI that serves as both the display device and the operation device such as a touch screen. In addition, the UI 34 may include a microphone, or the UI 34 may include a speaker that generates a sound. The UI 34 may not be included in the control device 14.

The memory 36 is a device that constitutes one or more storage areas that store various kinds of information. Examples of the memory 36 include a hard disk drive, various types of memories (e.g. a RAM, a DRAM, a ROM, etc.), other storage devices (e.g. an optical disk etc.), and a combination thereof. One or more memories 36 are included in the control device 14.

The memory 36 stores information for identifying the control device 14, address information for communication (e.g. address information on the wearable device 10, address information on the terminal apparatus 12, and address information on the control device 14), etc. For example, an IP address, a MAC address, and other addresses (e.g. an electronic mail address etc.) may be stored as the address information.

The processor 38 is configured to control operation of various portions of the control device 14. The processor 38 may include a memory.

For example, the processor 38 communicates with the various devices using the communication device 32. Specifically, the processor 38 transmits and receives information to and from the wearable device 10 and the terminal apparatus 12 using near-field wireless communication or other communication.

The information processing system according to the present exemplary embodiment will be described in detail below. In the following description, by way of example, it is assumed that pairing is completed between the wearable device 10 and the terminal apparatus 12 and the completed pairing is canceled in accordance with cancellation information from the control device 14.

In the case where paring is completed between the wearable device 10 and the terminal apparatus 12, the processor 38 of the control device 14 transmits cancellation information which indicates an instruction to cancel establishment of communication, that is, cancellation information which indicates an instruction to cancel the completed pairing, to at least one of the wearable device 10 and the terminal apparatus 12.

For example, the memory 36 of the control device 14 stores address information on each of the wearable device 10 and the terminal apparatus 12, and the processor 38 of the control device 14 transmits the cancellation information to at least one of the wearable device 10 and the terminal apparatus 12 using the address information.

By way of example, it is assumed that the control device 14 transmits the cancellation information to the wearable device 10. As a matter of course, the control device 14 may transmit the cancellation information to the terminal apparatus 12 without transmitting the cancellation information to the wearable device 10, or may transmit the cancellation information to both the wearable device 10 and the terminal apparatus 12.

Upon receiving the cancellation information from the control device 14, the processor 22 of the wearable device 10 cancels the pairing between the wearable device 10 and the terminal apparatus 12 in accordance with an instruction for cancellation indicated in the cancellation information. Consequently, information is not transmitted and received between the wearable device 10 and the terminal apparatus 12. For example, if the pairing is canceled when sound data or image data are transmitted from the terminal apparatus 12 to the wearable device 10 to be played back on the wearable device 10 through streaming, the sound data or the image data are not transmitted from the terminal apparatus 12 to the wearable device 10 so that the sound data or the image data are not played back on the wearable device 10.

For example, if pairing between the wearable device 10 and the terminal apparatus 12 is canceled in the case where the wearable device 10 is an ear-wearable device that includes an earphone or a headphone, sound data are not transmitted from the terminal apparatus 12 to the wearable device 10 so that a sound is not output from the earphone or the headphone.

If pairing between the wearable device 10 and the terminal apparatus 12 is canceled in the case where the wearable device 10 is a wearable device that includes a display device such as AR glasses, VR glasses, or MR glasses, image data are not transmitted from the terminal apparatus 12 to the wearable device 10 so that image data are not displayed on the wearable device 10.

In the case where paring is completed between one wearable device 10 and a plurality of terminal apparatuses 12, meanwhile, the processor 22 of the wearable device 10 cancels all the pairings completed with the plurality of terminal apparatuses 12. In the case where specific pairing to be canceled is designated from among the plurality of pairings by a manager etc. authorized for cancellation, the processor 22 of the wearable device 10 may cancel the specific pairing, and may not cancel the other pairings.

In the case where paring is completed between a plurality of wearable devices 10 and one terminal apparatus 12, meanwhile, the processor 22 of each of the wearable devices 10 cancels its own pairing.

In the case where the cancellation information is transmitted to the terminal apparatus 12, the processor 30 of the terminal apparatus 12 may cancel the pairing between the wearable device 10 and the terminal apparatus 12 in accordance with an instruction for cancellation indicated in the cancellation information. In this manner, pairing may be canceled by the processor 22 of the wearable device 10, or may be canceled by the processor 30 of the terminal apparatus 12. While pairing is canceled by the processor 22 of the wearable device 10 in the following description, pairing may be canceled by the processor 30 of the terminal apparatus 12.

The processor 38 of the control device 14 may transmit cancellation information to at least one of the wearable device 10 and the terminal apparatus 12 even in the case where pairing is not completed between the wearable device 10 and the terminal apparatus 12. In this case, the processor 22 of the wearable device 10 may not execute pairing in accordance with the cancellation information even upon receiving an instruction to pair the wearable device 10 and the terminal apparatus 12 with each other. In this manner, completion of pairing may be prevented.

In the case where the wearable device 10 is an ear-wearable device and the pairing between the wearable device 10 and the terminal apparatus 12 may not be canceled in accordance with the cancellation information, a specific sound with a volume determined in advance or more may be generated from the earphone or the headphone. For example, it is assumed that information that indicates completion of cancellation is transmitted from the wearable device 10 to the control device 14 in the case where cancellation of pairing is completed. In this case, in the case where the processor 38 of the control device 14 does not receive information that indicates completion of cancellation from the wearable device 10 (e.g. in the case where information that indicates completion of cancellation is not received even when a time determined in advance elapses since the time when the cancellation information is transmitted), the processor 38 of the control device 14 transmits volume control information, which indicates an instruction to generate a specific sound, to the wearable device 10. The processor 22 of the wearable device 10 causes the earphone or the headphone of the device itself to generate a specific sound in accordance with the volume control information. For example, the processor 22 of the wearable device 10 plays back the specific sound as superposed on a sound being played back. That is, the processor 22 of the wearable device 10 forcibly plays back the specific sound.

In another example, the processor 22 of the wearable device 10 may cause the earphone or the headphone of the device itself to generate a specific sound, even if the volume control information is not received, in the case where pairing may not be canceled in accordance with the cancellation information. That is, the processor 22 of the wearable device 10 attempts to cancel the pairing with the terminal apparatus 12 upon receiving the cancellation information from the control device 14, and causes the earphone or the headphone to generate a specific sound in the case where such cancellation is not successfully performed.

In still another example, the processor 38 of the control device 14 may transmit the volume control information to the wearable device 10 without transmitting the cancellation information to the wearable device 10. In this case, the processor 22 of the wearable device 10 causes the earphone or the headphone of the device itself to generate a specific sound in accordance with the volume control information without canceling the pairing with the terminal apparatus 12. In this manner, a specific sound may be generated from the earphone or the headphone without canceling pairing.

In still another example, the processor 22 of the wearable device 10 may cause the earphone or the headphone of the device itself to generate a specific sound upon receiving the cancellation information from the control device 14, and cancel pairing when a time determined in advance elapses since the time when the specific sound is generated.

Control for generating a specific sound may be performed by the processor 30 of the terminal apparatus 12, pairing of which with the wearable device 10 has been completed.

In the case where the wearable device 10 is a device that includes a display device such as AR glasses, VR glasses, or MR glasses and the pairing between the wearable device 10 and the terminal apparatus 12 may not be canceled in accordance with the cancellation information, a specific image determined in advance may be displayed on the display device. For example, in the case where information that indicates completion of cancellation of pairing is not received from the wearable device 10 which is the destination of transmission of the cancellation information, the processor 38 of the control device 14 transmits image control information, which indicates an instruction to display a specific image, to the wearable device 10. The processor 22 of the wearable device 10 causes the display device of the device itself to display the specific image in accordance with the image control information. For example, the processor 22 of the wearable device 10 plays back the specific image as superposed on an image being played back. That is, the processor 22 of the wearable device 10 forcibly displays the specific image.

In another example, the processor 22 of the wearable device 10 may cause the display device of the device itself to generate a specific image, even if the image control information is not received, in the case where pairing may not be canceled in accordance with the cancellation information. That is, the processor 22 of the wearable device 10 attempts to cancel the pairing with the terminal apparatus 12 upon receiving the cancellation information from the control device 14, and causes the display device to display a specific image in the case where such cancellation is not successfully performed.

In still another example, the processor 38 of the control device 14 may transmit the image control information to the wearable device 10 without transmitting the cancellation information to the wearable device 10. In this case, the processor 22 of the wearable device 10 causes the display device of the device itself to display a specific image in accordance with the image control information without canceling the pairing with the terminal apparatus 12. In this manner, a specific image may be displayed without canceling pairing.

In still another example, the processor 22 of the wearable device 10 may cause the display device of the device itself to display a specific image upon receiving the cancellation information from the control device 14, and cancel pairing when a time determined in advance elapses since the time when the specific image is displayed.

The volume control information or the image control information may be transmitted from the control device 14 to the terminal apparatus 12, and the processor 30 of the terminal apparatus 12 may cause the wearable device 10 to generate a specific sound in accordance with the volume control information, or may cause the wearable device 10 to display a specific image in accordance with the image control information.

For example, the processor 22 of the wearable device 10 may cancel pairing in accordance with the cancellation information in the case where the position of at least one of the wearable device 10 and the terminal apparatus 12 is included within a specific location range. For example, the processor 22 of the wearable device 10 cancels pairing in accordance with the cancellation information described above in the case where the position of the wearable device 10 is included within the specific location range. The processor 22 of the wearable device 10 may cancel pairing in accordance with the cancellation information in the case where the position of the terminal apparatus 12 is included within the specific location range or in the case where the respective positions of the wearable device 10 and the terminal apparatus 12 are included within the specific location range.

For example, the memory 20 of the wearable device 10 stores specific location information which is information that indicates a specific location, and the processor 22 of the wearable device 10 determines, on the basis of the specific location information, whether or not the position of the wearable device 10 or the terminal apparatus 12 is included within a specific location range. The specific location information may be transmitted from the control device 14 to the wearable device 10. In this case, the processor 22 of the wearable device 10 may determine, on the basis of the specific location information which is sent from the control device 14, whether or not the position of the wearable device 10 or the terminal apparatus 12 is included within the specific location range.

Positional information which indicates the position of each device is acquired using a known technique such as a global positioning system (GPS), for example. For example, each of the wearable device 10 and the terminal apparatus 12 includes a GPS function to acquire positional information on the device itself. The processor 22 of the wearable device 10 determines, on the basis of a position indicated in the thus acquired positional information, whether or not the respective positions of the wearable device 10 and the terminal apparatus 12 are included within the specific location range. The processor 22 of the wearable device 10 receives positional information on the terminal apparatus 12 from the terminal apparatus 12, and specifies the position of the terminal apparatus 12 on the basis of such positional information.

Alternatively, the user of the wearable device 10 may input information that indicates the position of the user to the wearable device 10 or the terminal apparatus 12. The processor 22 of the wearable device 10 may treat the position indicated in the thus input information as the position of the wearable device 10 or the terminal apparatus 12, and determine whether or not the position of the wearable device 10 or the terminal apparatus 12 is included within the specific location range.

The specific location range and the position of each device may be determined by the latitude and the longitude, may be determined by a relative position (e.g. a coordinate) from an origin as a reference position, or may be determined by the name, number, etc. of a building, room, space, etc. In addition, the specific location range and the position of each device may include the idea of height.

In another example, the processor 38 of the control device 14 may transmit cancellation information to the wearable device 10 in the case where the position of at least one of the wearable device 10 and the terminal apparatus 12 is included within a specific location range. The processor 38 of the control device 14 may transmit cancellation information to the wearable device 10 in the case where the position of one of the wearable device 10 and the terminal apparatus 12 is included within a specific location range.

Upon receiving the cancellation information, the processor 22 of the wearable device 10 cancels the pairing between the wearable device 10 and the terminal apparatus 12 in accordance with the cancellation information. For example, each of the wearable device 10 and the terminal apparatus 12 transmits positional information which indicates the position of the device itself to the control device 14. The processor 38 of the control device 14 specifies the position of each of the wearable device 10 and the terminal apparatus 12 on the basis of the positional information which is sent from each of the wearable device 10 and the terminal apparatus 12.

The specific location is not specifically limited. Examples of the specific location include a school, an examination site, a classroom, a workplace, a hospital, a hospital room, etc. As a matter of course, these examples are merely exemplary, and a different location may be determined as the specific location. For example, the specific location may be designated by a manager authorized to instruct cancellation of pairing, the user of the wearable device 10, etc.

For example, the memory 36 of the control device 14 stores the specific location information, and the processor 38 of the control device 14 determines, on the basis of the specific location information, whether or not the position of the wearable device 10 or the position of the terminal apparatus 12 is included within a specific location range.

For example, in the case where the wearable device 10 is an ear-wearable device that includes an earphone or a headphone and the position of the wearable device 10 is included within the specific location range, the processor 22 of the wearable device 10 cancels the pairing between the wearable device 10 and the terminal apparatus 12 in accordance with the cancellation information. Consequently, sound data are not transmitted from the terminal apparatus 12 to the wearable device 10 so that the wearable device 10 does not cause the earphone or the headphone to generate a sound.

In the case where the wearable device 10 is a device that includes a display device such as AR glasses, VR glasses, or MR glasses and the position of the wearable device 10 is included within the specific location range, the processor 22 of the wearable device 10 cancels the pairing between the wearable device 10 and the terminal apparatus 12 in accordance with the cancellation information described above. Consequently, image data are not transmitted from the terminal apparatus 12 to the wearable device 10 so that the wearable device 10 does not display an image.

The processor 38 of the control device 14 may transmit the cancellation information to a plurality of wearable devices 10. For example, the processor 38 of the control device 14 transmits the cancellation information to a plurality of wearable devices 10 located within a specific location range to cancel pairing between each of the plurality of wearable devices 10 and the terminal apparatus 12.

In one application example, it is conceivable that, when the user who has the wearable device 10 enters a specific location such as an examination site or a school, the address of the wearable device 10 of each user, the address of the terminal apparatus 12 of each user, etc. are registered in the control device 14. In this case, the processor 38 of the control device 14 transmits cancellation information which indicates an instruction to cancel pairing to each wearable device 10 located in the examination site or the school. This does not allow transmission and reception of information between the wearable device 10 and the terminal apparatus 12 at the specific location such as an examination site or a school. For example, sound data may not be transmitted from the terminal apparatus 12 to the wearable device 10 which is an ear-wearable device, or image data may not be transmitted from the terminal apparatus 12 to the wearable device 10 which includes a display device such as AR glasses.

In addition, the processor 38 of the control device 14 may keep transmitting the cancellation information to the wearable device 10 which is located within a specific location range. For example, the processor 38 of the control device 14 may keep transmitting the cancellation information also to the wearable device 10, pairing of which with the terminal apparatus 12 has been canceled. The processor 38 of the control device 14 may transmit the cancellation information to the wearable device 10 at time intervals determined in advance.

In the case where the position of the wearable device 10 is included within a specific location range and the pairing between the wearable device 10 and the terminal apparatus 12 may not be canceled in accordance with the cancellation information, in addition, the processor 22 of the wearable device 10 may cause the earphone or the headphone of the device itself to generate the specific sound discussed above, or may cause the display device of the device itself to display the specific image discussed above. For example, in the case where pairing may not be canceled, the processor 38 of the control device 14 may transmit the volume control information and the image control information discussed above to the wearable device 10, and the processor 22 of the wearable device 10 may cause the earphone or the headphone of the device itself to generate a specific sound in accordance with the volume control information, or may cause the display device of the device itself to display a specific image in accordance with the image control information. The processor 22 of the wearable device 10 may cause the earphone or the headphone to generate a specific sound, or may cause the display device to display a specific image, even if the volume control information or the image control information is not received, in the case where pairing may not be canceled. For example, it is conceivable to generate a specific sound or display a specific image in the case where the pairing between the wearable device 10 and the terminal apparatus 12 may not be canceled at a specific location such as an examination site or a school.

In another example, in the case where the position of the wearable device 10 is included within a specific location range, the processor 38 of the control device 14 may transmit the volume control information and the image control information to the wearable device 10 without transmitting the cancellation information to the wearable device 10. In this case, the processor 22 of the wearable device 10 causes the earphone or the headphone of the device itself to generate a specific sound in accordance with the volume control information, or causes the display device of the device itself to display a specific image in accordance with the image control information. For example, it is conceivable to cause the wearable device 10 to generate a specific sound or cause the wearable device 10 to display a specific image at a specific location such as an examination site or a school.

In the case where communication is established (e.g. in the case where pairing is completed) between the wearable device 10 and the terminal apparatus 12 at a specific time, the processor 22 of the wearable device 10 may cancel establishment of the communication (e.g. pairing) in accordance with the cancellation information. A case where completed pairing is canceled will be described below. The specific time may be a specific time slot, may be a specific date and time, or may be a specific period determined by the date and time, for example.

For example, the memory 20 of the wearable device 10 stores specific time information which indicates a specific time, and the processor 22 of the wearable device 10 determines, on the basis of the specific time information, whether or not the present time is included in the specific time (e.g. a specific time slot etc.). The specific time information may be transmitted from the control device 14 to the wearable device 10. In this case, the processor 22 of the wearable device 10 determines, on the basis of the specific time information which is sent from the control device 14, whether or not the present time is included in the specific time.

In another example, the memory 36 of the control device 14 may store specific time information, and the processor 38 of the control device 14 may transmit the cancellation information to the wearable device 10 at a specific time indicated in the specific time information. Upon receiving the cancellation information, the processor 22 of the wearable device 10 cancels the pairing with the terminal apparatus 12 in accordance with the cancellation information.

The processor 38 of the control device 14 may transmit the cancellation information to a plurality of wearable devices 10 at a specific time.

In addition, the processor 38 of the control device 14 may keep transmitting the cancellation information to the wearable device 10 for a specific time (e.g. a specific time slot etc.). For example, the processor 38 of the control device 14 may transmit the cancellation information also to the wearable device 10, pairing of which with the terminal apparatus 12 has been canceled. The processor 38 of the control device 14 may transmit the cancellation information to the wearable device 10 at time intervals determined in advance.

In one application example, the processor 38 of the control device 14 may transmit the cancellation information to the wearable device 10 at a time determined in advance before the start of an examination. In addition, the processor 38 of the control device 14 may keep transmitting the cancellation information to the wearable device 10 for a time slot for which an examination is conducted (e.g. since a time determined in advance before the start of an examination until a time at the end of the examination).

In the case where the pairing between the wearable device 10 and the terminal apparatus 12 may not be canceled in accordance with the cancellation information at a specific time, in addition, the processor 22 of the wearable device 10 may cause the earphone or the headphone of the device itself to generate the specific sound discussed above, or may cause the display device of the device itself to display the specific image discussed above. For example, in the case where pairing may not be canceled, the processor 38 of the control device 14 may transmit the volume control information and the image control information discussed above to the wearable device 10, and the processor 22 of the wearable device 10 may cause the earphone or the headphone of the device itself to generate a specific sound in accordance with the volume control information, or may cause the display device of the device itself to display a specific image in accordance with the image control information. The processor 22 of the wearable device 10 may cause the earphone or the headphone to generate a specific sound, or may cause the display device to display a specific image, even if the volume control information or the image control information is not received, in the case where pairing may not be canceled. For example, it is conceivable to generate a specific sound or display a specific image in the case where the pairing between the wearable device 10 and the terminal apparatus 12 may not be canceled during an examination.

In another example, the processor 38 of the control device 14 may transmit the volume control information and the image control information to the wearable device 10, without transmitting the cancellation information to the wearable device 10, at a specific time. In this case, the processor 22 of the wearable device 10 causes the earphone or the headphone of the device itself to generate a specific sound in accordance with the volume control information, or causes the display device of the device itself to display a specific image in accordance with the image control information. For example, it is conceivable to cause the wearable device 10 to generate a specific sound or cause the wearable device 10 to display a specific image during an examination.

In addition, the pairing between the wearable device 10 and the terminal apparatus 12 may be canceled at a specific location and at a specific time. For example, the pairing may be canceled at an examination site and in a time slot for which an examination is conducted. In addition, a specific sound may be generated from the wearable device 10, or a specific image may be displayed on the wearable device 10, at a specific location and at a specific time.

An instruction to cancel pairing, an instruction to generate a specific sound, and an instruction to display a specific image may be provided by a manager (e.g. an examination proctor etc.) authorized to provide such instructions. For example, information for logging in to the control device 14 may be provided to only the manager to allow only the manager to log in to the control device 14 and provide such instructions. In addition, the manager may be requested to input information (e.g. an ID, a password, etc.) that proves him/her to be authorized when he/she provides such instructions using the control device 14, and be allowed to provide the instructions when the manager inputs such information.

The processor 22 of the wearable device 10 may cancel the pairing with the terminal apparatus 12 in accordance with the cancellation information in the case where at least one of the wearable device 10 and the terminal apparatus 12 is worn by the user.

For example, the processor 22 of the wearable device 10 cancels the pairing with the terminal apparatus 12 in accordance with the cancellation information in the case where the wearable device 10 which is an ear-wearable device is worn on an ear of the user. In the case where the earphone or the headphone itself constitutes the ear-wearable device, the processor 22 of the wearable device 10 cancels the pairing with the terminal apparatus 12 in accordance with the cancellation information in the case where the earphone is worn on an ear of the user or the headphone is worn on the head.

In the case where the wearable device 10 is a glass-type device such as AR glasses and the wearable device 10 is worn on the face of the user, meanwhile, the processor 22 of the wearable device 10 cancels the pairing with the terminal apparatus 12 in accordance with the cancellation information.

The processor 38 of the control device 14 may transmit the cancellation information to the wearable device 10 in the case where the wearable device 10 is worn by the user. Upon receiving the cancellation information, the processor 22 of the wearable device 10 cancels the pairing with the terminal apparatus 12 in accordance with the cancellation information.

For example, a camera (e.g. a monitoring camera, a security camera, etc.) installed around the user captures the user, and the processor 38 of the control device 14 analyzes captured image data to determine whether or not the user wears the wearable device 10. It may be determined whether or not the user wears the wearable device 10 using various sensors other than the camera.

The processor 38 of the control device 14 may transmit the volume control information and the image control information discussed above to the wearable device 10, without transmitting the cancellation information to the wearable device 10, in the case where the wearable device 10 is worn by the user. The processor 22 of the wearable device 10 causes the earphone or the headphone of the device itself to generate a specific sound in accordance with the volume control information, or causes the display device of the device itself to display a specific image in accordance with the image control information.

In the case where the wearable device 10 is located within a specific location range and the wearable device 10 is worn by the user, the processor 38 of the control device 14 may transmit the cancellation information, the volume control information, and the image control information to the wearable device 10. That is, in the case where the user wears the wearable device 10 at a specific location, the pairing between the wearable device 10 and the terminal apparatus 12 is canceled, a specific sound is generated from the wearable device 10, or a specific image is displayed on the wearable device 10.

In the case where the user wears the wearable device 10 at a specific time, the processor 38 of the control device 14 may transmit the cancellation information, the volume control information, and the image control information to the wearable device 10. That is, in the case where the user wears the wearable device 10 at a specific time, the pairing between the wearable device 10 and the terminal apparatus 12 is canceled, a specific sound is generated from the wearable device 10, or a specific image is displayed on the wearable device 10.

In the case where the user wears the wearable device 10 at a specific location and at a specific time, the processor 38 of the control device 14 may transmit the cancellation information, the volume control information, and the image control information to the wearable device 10.

The wearable device 10 or the terminal apparatus 12 may be set such that cancellation of pairing according to the cancellation information which is sent from the control device 14 is permitted. In this case, pairing of the wearable device 10 which has been so set is canceled in accordance with the cancellation information. For example, it is conceivable that the wearable device 10 is so set upon entering a specific location such as an examination site so that pairing of the wearable device 10 is canceled in accordance with the cancellation information.

Devices for which establishment of communication is to be forcibly canceled (e.g. devices of which pairing is to be forcibly canceled) and devices for which establishment of communication is not to be forcibly canceled (e.g. devices of which pairing is not to be forcibly canceled) may be determined in advance. An example in which pairing of devices is to be canceled will be described by way of example.

For example, information (e.g. black list information) that indicates one or more devices of which pairing is to be forcibly canceled and information (e.g. white list information) that indicates one or more devices of which pairing is not to be forcibly canceled is generated in advance, and stored in the memory 36 of the control device 14. For example, the processor 38 of the control device 14 registers the wearable device 10 and the terminal apparatus 12 in the black list information and the white list information in accordance with an instruction from a manager etc.

The black list information and the white list information may be stored in the memory 20 of the wearable device 10 or the memory 28 of the terminal apparatus 12. In another example, the memory 20 of the wearable device 10 may store information indicating that the wearable device 10 itself is a device registered in the black list information or the white list information. Similarly, the memory 28 of the terminal apparatus 12 may store information indicating that the terminal apparatus 12 itself is a device registered in the black list information or the white list information.

The processor 38 of the control device 14 continuously or intermittently transmits the cancellation information to a specific location.

For example, in the case where pairing is completed between the wearable device 10 and the terminal apparatus 12 and at least one of the wearable device 10 and the terminal apparatus 12 is registered in the black list information and disposed within the specific location range described above as the destination of transmission of the cancellation information, the processor 22 of the wearable device 10 or the processor 30 of the terminal apparatus 12 cancels the pairing in accordance with the cancellation information.

For example, in the case where the wearable device 10 is registered in the black list information and disposed within the specific location range described above, the processor 22 of the wearable device 10 receives the cancellation information which is transmitted to the specific location, and cancels pairing in accordance with the cancellation information. In this case, the processor 22 of the wearable device 10 cancels pairing even in the case where the terminal apparatus 12 is not registered in the black list information or in the case where the terminal apparatus 12 is not disposed within the specific location range.

In the case where the wearable device 10 is registered in the black list information but is not disposed within the specific location range described above and the terminal apparatus 12 is disposed within the specific location range described above, meanwhile, the processor 30 of the terminal apparatus 12 may receive the cancellation information which is transmitted to the specific location, and may, or may not, cancel pairing in accordance with the cancellation information. For example, the processor 30 of the terminal apparatus 12 may cancel pairing in the case where the terminal apparatus 12 is registered in the black list information, and may not cancel pairing in the case where the terminal apparatus 12 is not registered in the black list information but is registered in the white list information.

In the case where pairing is completed between the wearable device 10 and the terminal apparatus 12 and the wearable device 10 and the terminal apparatus 12 are not registered in the black list information but are registered in the white list information, on the other hand, the processor 22 of the wearable device 10 or the processor 30 of the terminal apparatus 12 does not cancel the pairing even in the case where at least one of the wearable device 10 and the terminal apparatus 12 is disposed within the specific location range described above. In this case, at least one of the wearable device 10 and the terminal apparatus 12 which is disposed within the specific location range receives the cancellation information which is transmitted to the specific location, but does not cancel the pairing.

Examples of the specific location include a classroom and an examination room. In this case, the processor 38 of the control device 14 transmits the cancellation information to the classroom or the examination room. The wearable device 10 and the terminal apparatus 12 of students or examinees are registered in the black list information. The wearable device 10 and the terminal apparatus 12 of teachers or examiners are registered in the white list information. The wearable device 10 and the terminal apparatus 12 of the teachers or the examiners receive the cancellation information which is transmitted to the classroom or the examination room, but do not cancel pairing. On the other hand, the wearable device 10 and the terminal apparatus 12 of the students or the examinees receive the cancellation information which is transmitted to the classroom or the examination room, and cancel pairing in accordance with the cancellation information. In this manner, it is possible to forcibly cancel the pairing of the wearable device 10 and the terminal apparatus 12 of the students or the examinees without forcibly canceling the pairing of the wearable device 10 and the terminal apparatus 12 of the teachers or the examiners. The classroom and the examination room are merely examples of the specific location, and the same applies to other examples of the specific location.

The processor 38 of the control device 14 may transmit the volume control information and the image control information discussed above, in place of the cancellation information, to a specific location. In addition, the processor 38 of the control device 14 may transmit the volume control information and the image control information to a specific location in the case where pairing is not canceled.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
cancel establishment of communication between an external device and the information processing apparatus in accordance with an instruction to cancel the establishment of the communication, the instruction being sent to the information processing apparatus from another device that is different from the external device and the information processing apparatus,
wherein a device for which the establishment of the communication is to be forcibly canceled and a device for which the establishment of the communication is not to be forcibly canceled are determined in advance, and the instruction is sent to a specific location;
cancel the establishment of the communication in accordance with the instruction in a case where at least one of the external device and the information processing apparatus is determined as the device for which the establishment of the communication is to be forcibly canceled and is disposed within a range of the specific location; and
not cancel the establishment of the communication in a case where the external device and the information processing apparatus are determined as the device for which the establishment of the communication is not to be forcibly canceled, even in a case where at least one of the external device and the information processing apparatus is disposed within the range of the specific location.

2. The information processing apparatus according to claim 1,
wherein the processor is configured to cancel the establishment of the communication in accordance with the instruction in a case where a position of at least one of the external device and the information processing apparatus is included within a specific location range.

3. The information processing apparatus according to claim 2,
wherein the processor is configured to cancel the establishment of the communication in accordance with the instruction in a case where the communication is established at a specific time.

4. The information processing apparatus according to claim 3,
wherein the instruction is provided by a manager authorized to cancel the establishment of the communication.

5. The information processing apparatus according to claim 3,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

6. The information processing apparatus according to claim 2,
wherein the instruction is provided by a manager authorized to cancel the establishment of the communication.

7. The information processing apparatus according to claim 6,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

8. The information processing apparatus according to claim 2,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

9. The information processing apparatus according to claim 1,
wherein the processor is configured to cancel the establishment of the communication in accordance with the instruction in a case where the communication is established at a specific time.

10. The information processing apparatus according to claim 9,
wherein the instruction is provided by a manager authorized to cancel the establishment of the communication.

11. The information processing apparatus according to claim 10,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

12. The information processing apparatus according to claim 9,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

13. The information processing apparatus according to claim 1,
wherein the instruction is provided by a manager authorized to cancel the establishment of the communication.

14. The information processing apparatus according to claim 13,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

15. The information processing apparatus according to claim 1,
wherein at least one of the external device and the information processing apparatus is a device worn by a user of the external device and the information processing apparatus to be used, and
the processor is configured to cancel the establishment of the communication in accordance with the instruction in a case where at least one of the external device and the information processing apparatus is worn by the user.

16. The information processing apparatus according to claim 1,
wherein the external device or the information processing apparatus includes a display device worn by a user of the external device and the information processing apparatus to be used, and
the processor is further configured to cause the display device to display an image determined in advance in a case where it is not possible to cancel the establishment of the communication in accordance with the instruction.

17. An information processing apparatus comprising:
a processor configured to:
cancel establishment of communication between an external device and the information processing apparatus in accordance with an instruction to cancel the establishment of the communication, the instruction being sent to the information processing apparatus from another device that is different from the external device and the information processing apparatus,
wherein the external device or the information processing apparatus includes a speaker worn by a user of the external device and the information processing apparatus to be used; and
cause the speaker to generate a sound with a volume that is equal to or more than a volume determined in advance in a case where it is not possible to cancel the establishment of the communication in accordance with the instruction.

18. A non-transitory computer readable medium storing a program causing a computer to execute a process comprising:
canceling establishment of communication between an external device and an information processing apparatus in accordance with an instruction to cancel the establishment of the communication, the instruction being sent to the information processing apparatus from another device that is different from the external device and the information processing apparatus,
wherein a device for which the establishment of the communication is to be forcibly canceled and a device for which the establishment of the communication is not to be forcibly canceled are determined in advance, and the instruction is sent to a specific location;
canceling the establishment of the communication in accordance with the instruction in a case where at least one of the external device and the information processing apparatus is determined as the device for which the establishment of the communication is to be forcibly canceled and is disposed within a range of the specific location; and
not canceling the establishment of the communication in a case where the external device and the information processing apparatus are determined as the device for which the establishment of the communication is not to be forcibly canceled, even in a case where at least one of the external device and the information processing apparatus is disposed within the range of the specific location.

* * * * *